United States Patent
Mueller et al.

(10) Patent No.: US 8,040,011 B2
(45) Date of Patent: Oct. 18, 2011

(54) GENERATOR AND MAGNETIC FLUX CONDUCTING UNIT

(75) Inventors: Markus Mueller, Edinburgh (GB); Kenneth Ochije, Edinburgh (GB)

(73) Assignee: The University Court of the University of Edinburgh, Edinburgh (GB)

( * ) Notice: Subject to any disclaimer, the term of this patent is extended or adjusted under 35 U.S.C. 154(b) by 37 days.

(21) Appl. No.: 12/293,220

(22) PCT Filed: Mar. 14, 2007

(86) PCT No.: PCT/GB2007/000883
§ 371 (c)(1),
(2), (4) Date: Apr. 1, 2009

(87) PCT Pub. No.: WO2007/104976
PCT Pub. Date: Sep. 20, 2007

(65) Prior Publication Data
US 2009/0174277 A1    Jul. 9, 2009

(30) Foreign Application Priority Data

Mar. 16, 2006   (GB) .................................. 0605298.9

(51) Int. Cl.
*H02K 1/27* (2006.01)
(52) U.S. Cl. .................................. 310/156.64; 310/268
(58) Field of Classification Search ............. 310/154.04, 310/154.06, 154.08, 154.23, 216.023–216.039, 310/266–268, 12.01, 12.12, 12.15, 12.24, 310/12.25, 156.64
See application file for complete search history.

(56) References Cited

U.S. PATENT DOCUMENTS

| | | | | |
|---|---|---|---|---|
| 2,623,187 A * | 12/1952 | Adams | ...................... | 310/154.23 |
| 3,665,227 A * | 5/1972 | Busch | .............................. | 310/46 |
| 3,896,320 A * | 7/1975 | Moffatt | ........................... | 310/64 |
| 5,087,844 A * | 2/1992 | Takedomi et al. | ......... | 310/12.15 |
| 5,337,030 A * | 8/1994 | Mohler | .................... | 310/156.37 |
| 5,514,923 A * | 5/1996 | Gossler et al. | .................. | 310/74 |
| 5,977,684 A * | 11/1999 | Lin | ............................... | 310/268 |
| 6,750,588 B1 * | 6/2004 | Gabrys | ......................... | 310/268 |
| 6,791,222 B1 * | 9/2004 | Maslov et al. | ........... | 310/156.38 |

(Continued)

FOREIGN PATENT DOCUMENTS

CN            1282136 A       1/2001

(Continued)

OTHER PUBLICATIONS

Spooner et al., "Vernier Hybrid Machines", IEE Proc-Electr. Power Appl., Nov. 2003, vol. 150, No. 6, pp. 655-662.
Spooner et al., "Vernier Hybrid Machines for Compact Drive Applications", Proceeding of the 2nd IEE International Conference on Power Electronics, Machines and Drives, 2004, pp. 452-457.
Spooner et al., "Lightweight, Ironless-Stator, PM Generators for Direct-Drive Wind Turbines", The Institution of Electrical Engineers, 2004, pp. 29-33.

(Continued)

*Primary Examiner* — Tran Nguyen
(74) *Attorney, Agent, or Firm* — Pepper Hamilton LLP

(57) ABSTRACT

The invention relates to a generator, to a magnetic flux conducting unit for a generator, and to a power generation machine comprising such a generator. In an embodiment of the invention, a generator is disclosed which comprises at least one coil assembly and at least one magnetic flux conducting unit. The magnetic flux conducting unit comprises at least one magnet, a pair of opposed magnetic flux conducting elements defining a space therebetween for receiving the coil assembly, and at least one connection portion extending between the opposed magnetic flux conducting elements. The at least is arranged relative to the opposed magnetic flux conducting elements such that the magnetic attraction forces between the elements are redacted through and balances with the connection portion.

16 Claims, 8 Drawing Sheets

U.S. PATENT DOCUMENTS

| | | | |
|---|---|---|---|
| 7,576,452 B2 * | 8/2009 | Shikayama et al. | 310/12.24 |
| 2004/0080238 A1 | 4/2004 | Cunningham | |
| 2006/0038456 A1 * | 2/2006 | Bojiuc | 310/156.32 |

FOREIGN PATENT DOCUMENTS

| | | |
|---|---|---|
| CN | 2731826 Y | 10/2005 |
| DE | 3101918 A1 | 8/1982 |
| WO | 02099950 A1 | 12/2002 |
| WO | 03003546 A1 | 1/2003 |

OTHER PUBLICATIONS

Spooner et al., "Lightweight Ironless-Stator PM Generators for Direct Drive Wind Turbines", IEE Proc-Electr. Power Appl., Jan. 2005, vol. 150, No. 1, pp. 17-26.

Mueller et al., "Direct Drive Electrical Power Take-Off for Offshore Marine Energy Converters", Proc. IMechE, Part A, 2005 pp. 223-234.

* cited by examiner

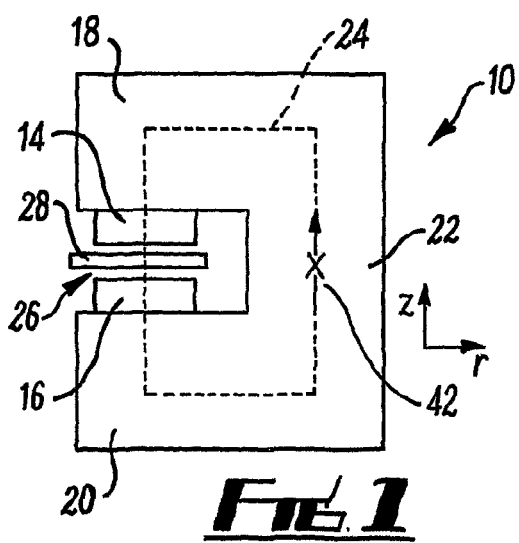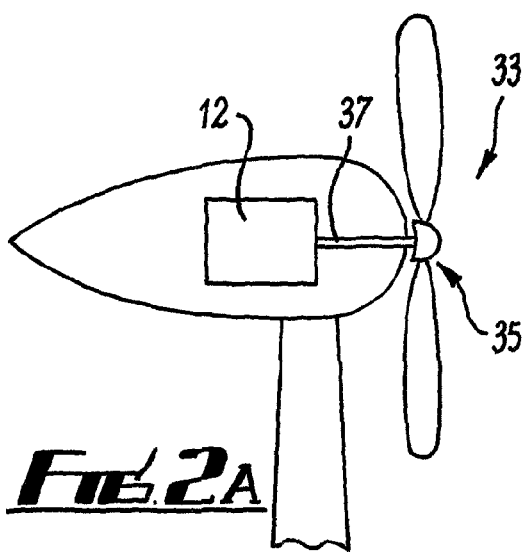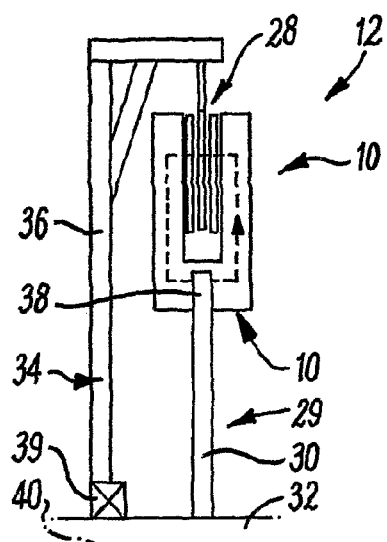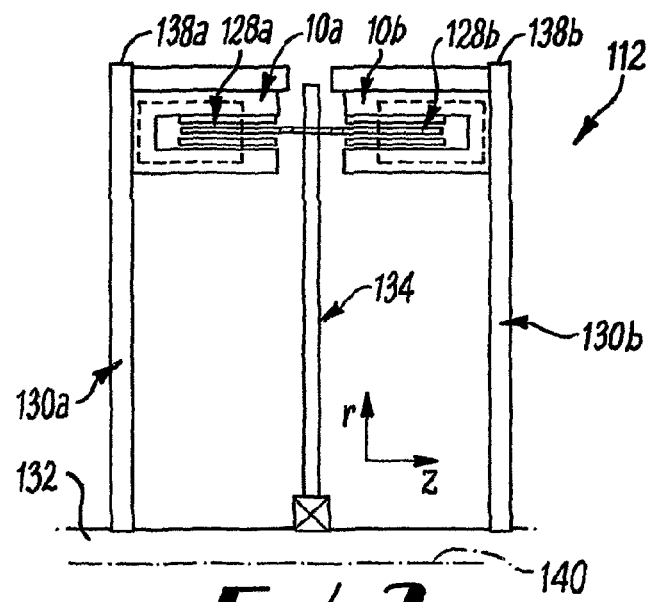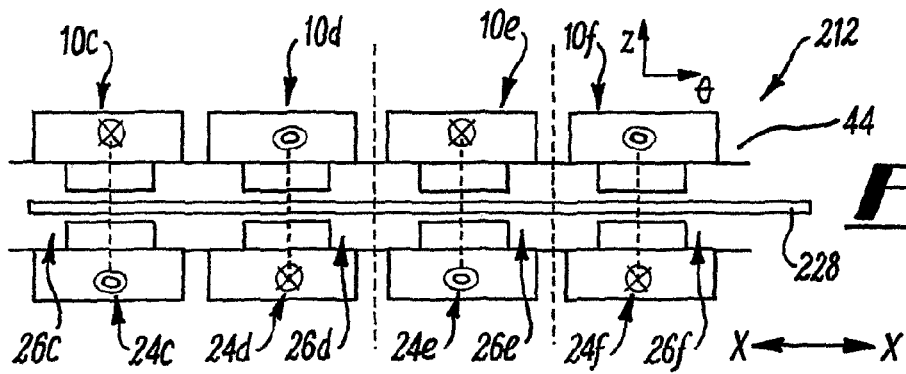

US 8,040,011 B2

GENERATOR AND MAGNETIC FLUX CONDUCTING UNIT

CROSS-REFERENCE TO RELATED APPLICATIONS

This application claims the priority to the benefit of International Patent Application PCT/GB2007/000883 with an International Filing Date on Mar. 14, 2007 with subsequent publication as International Publication Number WO 2007/104976 on Sep. 20, 2007. PCT/GB2007/000883, in turn, claims priority to Great Britain Patent Application No. 0605298.9, filed Mar. 16, 2006. The disclosures of each of the aforementioned patent documents are incorporated herein by reference in their entirety.

BACKGROUND

The present invention relates to a generator, to a magnetic flux conducting unit for a generator, and to a power generation machine comprising such a generator. In particular, but not exclusively the present invention relates to a direct drive generator and to a magnetic flux conducting unit for a direct drive generator.

In the field of electricity generation, it is well known to provide a generator coupled to a fluid driven turbine such as those found in oil, gas, coal and nuclear power stations. Conventional generators comprise a rotor having an iron core with a number of current-carrying coils wound on the core, and an iron-cored stator carrying a winding. A magnetic field is generated by passing a current along the rotor coils such that, on rotation of the rotor, a current is induced in the coils of the stator winding. The rotors of generators found in power stations are coupled to the turbine by a drive shaft which rotates at a high rotational velocity, of the order of several thousand rpm, and with a relatively low drive torque. Conventional power generators, manufactured with this in mind, have therefore been designed for high velocity, low torque operation.

In recent years, significant research has been conducted worldwide into sustainable electricity generation methods, including wind, wave and tidal power generation.

Existing wind machines comprise a prime mover in the form of a large diameter rotor. The rotor has a number of rotor blades, mounted on a rotor shaft, which is coupled to a power generator. The turbine rotor typically rotates at relatively low rotational speeds and at a high output torque, for example, 20 rpm for a 2MW machine, with an output torque of around 955 kNm. It will therefore be understood that turbines of this type operate at relatively low rotational speeds, but with a relatively high torque output. In order to successfully generate power in such low speed, high torque machines, conventional power generators (designed for high speed, low torque operation) require to be connected to the turbine rotor through a gearbox. The gearbox increases the rotational speed and decreases the torque of the output from the turbine rotor which is input to the generator.

Use of gearboxes of this type is generally undesired as there are a number of significant disadvantages. In particular, the gearboxes are relatively large and heavy, greatly increasing the weight of the unit provided in the nascelle at the top of the wind turbine tower. Additionally, provision of a gearbox between the output shaft of the turbine rotor and the input shaft of the generator reduces the efficiency of the machine.

Furthermore, these gearboxes have been found to be surprisingly unreliable under typical wind turbine operating conditions. The main cause for this is the constant variation in the operating speed and torque transmitted through the gearbox, due to fluctuations in wind velocity.

Similar problems have been experienced in power generation systems using wave and tidal forces, where the prime movers of the systems operate at even lower rotational or cycling velocities, and hence at still higher torques or thrust forces.

To address these problems, different types of power generators have been developed which are designed for low speed, high torque operation, for direct connection to, for example, the rotor of a wind machine.

Examples of these types of generator include conventional permanent magnet generators, and high force density machines such as the Transverse Flux Machine (TFM) and the Vernier Hybrid Machine (VHM) of Newage AVK SEG, which have been proposed for direct drive systems. A particular application of these generators which has been identified is in wave power machines. A linear VHM machine includes opposed magnetic flux conducting cores which are generally C-shaped in cross-section, with a number of successively oppositely polarized pairs of magnets arrayed on arms of the cores, on either side of an air gap between the two opposed cores. A translator with upper and lower castellated surfaces is arranged in the air gap and is coupled to the prime mover of the power generating machine. In use, the translator reciprocates back and forth within the air gap and as the castellated portions of the translator successively align with oppositely polarized pairs of magnets, the magnetic flux flow between the two cores switches, the frequency of this switching depending upon the velocity of reciprocation of the translator. Coils are arranged on arms of the cores and thus power is generated as the magnetic field switches.

Machines of this type, those with an iron core on the stationary and moving members, suffer from significant disadvantages, particularly in that extremely large magnetic attraction forces exist between the two cores. This requires a very large and heavy support structure for the cores, in order to maintain the air gap, with a resultant effect upon the size and weight of the generator. Additionally, manufacture and assembly of the generator, due to these large magnetic attraction forces, is extremely difficult.

In an effort to address problems such as those associated with the aforementioned iron cored machines, a low force density generator, disclosed in International Patent Application Number PCT/GB02/02288, has been proposed. The generator disclosed in PCT/GB02/02288 is designed for use with a wind turbine, and is therefore a rotary generator. In the disclosed generator, the iron on the stator of the generator has been removed, and coils on the stator are supported by a non-magnetic material. In this machine, flux coming out of the moving iron surface of an iron core on a rotor of the machine has no iron surface to flow into, hence the magnetic flux effectively sees an infinitely large magnetic air gap. The flux density is therefore relatively low, and the efficiency and effectiveness of the machine is significantly reduced when compared with other generators. Accordingly, significantly more magnetic material is required on the rotor in order to achieve anything like a suitable operating efficiency. As a result, the physical diameter of the machines is required to be greatly increased. For example, for a 5MW air-cored machine, it is estimated that the machine would be 26 meters in diameter, being of the order of two to three times the diameter of an equivalent iron-cored generator.

In an alternative type of rotary generator, two iron discs are located in opposition with an air gap therebetween, and with an air cored winding sandwiched between the two moving discs. Magnets are provided on the iron discs, with successive pairs of magnets (in a circumferential direction) being of opposite polarity. When the discs rotate, the stationary windings successively experience a switching magnetic flux flow, thereby generating electricity.

However, machines of this type have extremely large magnetic attraction forces between the two discs, presenting problems of requiring a large and heavy support structure of the type described above. This presents a particularly difficult problem during manufacture of these relatively large machines, as it is extremely difficult to maintain the small air gap required (in order to maximize flux density) whilst keeping the iron discs apart.

It is therefore amongst the objects of embodiments of the present invention to obviate or mitigate at least one of the forgoing disadvantages.

SUMMARY

According to first aspect of the present invention, there is provided a generator comprising at least one coil assembly and at least one magnetic flux conducting unit, the at least one magnetic flux conducting unit comprising: at least one magnet; a pair of opposed magnetic flux conducting elements defining a space therebetween for receiving a coil assembly; and at least one connecting portion extending between the opposed magnetic flux conducting elements; wherein the at least one magnet is arranged relative to the opposed magnetic flux conducting elements such that magnetic attraction forces between the elements are reacted through and balanced within the connecting portion.

According to a second aspect of the present invention, there is provided a magnetic flux conducting unit for a generator, the magnetic flux conducting unit comprising: at least one magnet; a pair of opposed magnetic flux conducting elements defining a space therebetween for receiving a coil assembly of a generator; and at least one connecting portion extending between the opposed magnetic flux conducting elements; wherein the at least one magnet is arranged relative to the opposed magnetic flux conducting elements such that magnetic attraction forces between the elements are reacted through and balanced within the connecting portion.

By reacting the magnetic attraction forces which exist between the flux conducting elements through the connection portion, and by balancing the forces within the connecting portion, it is not necessary to provide a large, heavy support structure in order to maintain the air gap between the flux conducting elements. It will be understood that references herein to the magnetic attraction forces between the flux conducting elements being reacted through and balanced within the connecting portion are to mechanical loading on the flux conducting unit as a result of these attraction forces being transmitted to the connecting portion from the flux conducting elements, and to the flux conducting unit being arranged such that the mechanical forces in the flux conducting elements act against each other and therefore balance or cancel out. This greatly reduces the weight of the generator; eases manufacture; reduces manufacturing time; and consequently reduces cost when compared to known generators.

It will be understood that the connecting portion, in extending between the opposed magnetic flux conducting elements, thereby defines a maximum extent of the space or air gap between the elements.

In preferred embodiments, the generator is a direct drive generator and is adapted to be coupled directly to a prime mover of a power generation machine. The generator may therefore be adapted to be coupled to a drive member (such as an output shaft or rotor) of a wind power generation machine; a tidal power generation machine; or a wave power generation machine; or a free piston Stirling engine in a combined heat and power plant, for example. It will be understood that a direct drive generator is one where the generator is driven directly from or by the drive member of a power generation machine.

Alternatively, the generator may be an indirect or non-direct generator, for indirect or non-direct drive applications; some wind turbine applications involve a single stage gearbox to step the speed from, say, 10 rpm to 100 rpm. The generator may therefore be utilized in such circumstances, which is still considered to be a low speed application. Furthermore, the generator could be used in both motoring and generating applications at any speed.

Preferably, the at least one magnet is arranged relative to the opposed magnetic flux conducting elements such that a magnetic flux flow path within the magnetic flux conducting unit extends through the connecting portion. Thus the connecting portion may be magnetic flux conducting and may be located within or may define part of a flux flow path in the unit.

The magnetic flux conducting unit may be generally C-shaped in cross-section, the connecting portion forming a base or central member and the elements coupled in a cantilever arrangement relative to the base. The space or air gap may be defined between the two opposed elements with the coil assembly received within the air gap. Alternatively, the magnetic flux conducting unit may be generally I shaped in cross-section, the connecting portion forming a base or central member and the elements coupled to the central member so as to form two cantilevered sections either side of the central member, with two spaces or air gaps between the flux conducting elements on either side of the connecting portion. There may be two coil assemblies, one received in each air gap. In each above case, the at least one magnet may be arranged such that magnetic attraction forces between the flux conducting elements generate mechanical loads within the elements, these mechanical loads transmitted to the connecting portion(s) and reacted against each other. Thus the mechanical loads are contained within the unit. Where the elements are cantilevered, or include sections that are cantilevered, relative to the connecting portion(s), turning moments may be generated about the connection portion. However, the at least one magnet may be arranged such that the turning moments of each element are equal and opposite and centered about a neutral axis of the connecting portion, to balance out the loads.

In a further alternative, the magnetic flux conducting unit may be generally rectangular or square in cross-section, with two connection portions extending between the opposed magnetic flux conducting elements and with a space or air gap defined between the two connecting portions, and a coil assembly located within the air gap. The mechanical loads in the elements may be transmitted to both connection portions, and the at least one magnet may be arranged so that turning moments around central axes of the connection portions are balanced out, as described above.

In embodiments of the invention, the magnet is arranged within the space or air gap defined between the elements. The unit may comprise a magnet coupled to each element, the magnets arranged with opposite poles facing one another and with a coil assembly disposed between the opposing surfaces of the magnets. The unit may comprise a C-core, the connecting portion forming a base or side of the C-core, and the flux conducting elements forming opposing arms of the C-core. The unit may comprise two such C-cores provided back to back, which may share a common connecting portion. It will therefore be understood that such a unit may be generally I-shaped and may therefore form an I-core. The generator may therefore comprise two coil assemblies, the coil assemblies disposed either side of the connecting portion, and two pairs of magnets coupled to the elements either side of the connecting portions.

In alternative embodiments of the invention, the at least one magnet may define or form the connecting portion of the flux conducting unit. The at least one magnet may therefore serve to define the air gap between the flux conducting elements. The unit may be generally C-shaped, the magnet forming a base or central member, and the flux conducting elements forming opposing arms. The unit may comprise two such assemblies provided back to back, which may therefore share a common magnet, and it will be understood that such a unit may be generally I-shaped. The generator may comprise two coil assemblies, one disposed in each of the spaces or air gaps defined either side of the magnet.

In further alternative embodiments of the invention, the unit may comprise two magnets extending between the flux conducting elements, each magnet defining a connecting portion, and a space or air gap defined between the magnets for receiving a coil assembly. Alternatively, the unit may comprise a one-piece body defining the flux conducting elements, and thus the flux conducting units may form one continuous section with an optionally rectangular portion removed from the centre. Magnets may be positioned on opposite faces and a winding sandwiched between the two in the remaining airspace. The unit may be generally rectangular or square in cross-section.

Preferably, the generator comprises a plurality of magnetic flux conducting units, and the direction of flow of magnetic flux within each unit and through the respective at least one space or air gap may be opposite to that in the or each adjacent flux conducting unit. In this fashion, relative movement between the flux conducting units progressively switches a direction of flux flow through the coil assembly, generating a current within the coil assembly.

The generator may be a rotary generator and may comprise a rotor and a stator, the rotor adapted to be coupled to a drive member of a prime mover of a power generation machine and thereby adapted for rotation relative to the stator. The at least one coil assembly may be provided on one of the rotor and the stator, and the at least one magnetic flux conducting unit may be provided on the other one of the rotor and the stator. Where the generator comprises a plurality of units, the units may be arranged circumferentially around the rotor or stator and may be arranged such that a main axis or plane of the flux conducting elements of the units are parallel to an axis of a shaft of the rotor, or perpendicular to the rotor axis.

Alternatively, the generator may be a linear generator and may comprise a translator and a stator, the translator adapted to be coupled to a drive member of a prime mover of a power generation machine. The coil assembly may be provided on one of the translator and the stator and the at least one flux conducting unit on the other one of the translator and the stator. The generator may comprise a plurality of flux conducting units, the units extending along a plane parallel to a plane of the translator. The generator may comprise a plurality of translators and corresponding stators, each translator coupled to a common drive member of a prime mover.

Where the generator comprises a plurality of units, adjacent units may be separated by an air gap or by spacers which are non-magnetically conductive/magnetically insulating, or of negligible magnetic conductivity compared to the magnetic flux conducting units. Alternatively the adjacent units could be butted up against one another so that they are not separated by an airgap/spacer.

The at least one magnet may be a permanent magnet and may be magnetized following location within the unit. This may facilitate assembly of the unit by ensuring that the magnet is placed in a desired location prior to magnetization and thus before any magnetic attraction forces are generated. To facilitate construction of the unit, a clip or clamp may be provided for locating the at least one magnet in the unit prior to magnetization. Alternatively, the at least one magnet may be magnetized prior to location within the unit.

The at least one coil assembly may comprise a plurality of current conducting coils and may be of copper or other suitable material. The magnetic flux conducting elements may be of iron, a ferrous alloy such as steel or the like. The at least one connecting portion may similarly be of iron or of a ferrous alloy.

According to third aspect of the present invention, there is provided a generator comprising at least one coil assembly and at least one magnetic flux conducting unit, the at least one magnetic flux conducting unit comprising: a pair of opposed magnetic flux conducting elements defining a space therebetween for receiving a coil assembly; and at least one magnet extending between the opposed magnetic flux conducting elements, the at least one magnet arranged relative to the opposed magnetic flux conducting elements such that magnetic attraction forces between the elements are reacted through and balanced within the at least one magnet.

According to a fourth aspect of the present invention, there is provided a magnetic flux conducting unit for a generator, the magnetic flux conducting unit comprising: a pair of opposed magnetic flux conducting elements defining a space therebetween for receiving a coil assembly of the generator; and at least one magnet extending between the opposed magnetic flux conducting elements, the at least one magnet arranged relative to the opposed magnetic flux conducting elements such that magnetic attraction forces between the elements are reacted through and balanced within the at least one magnet.

According to a fifth aspect of the present invention, there is provided a power generation machine comprising the generator of the first or third aspect of the invention.

BRIEF DESCRIPTION OF THE DRAWINGS

Embodiments of the present invention will now be described, by way of example only, with reference to the accompanying drawings, in which:

FIG. 1 is a schematic view of a magnetic flux conducting unit for a generator, in accordance with an embodiment of the present invention;

FIG. 2 is a schematic side view of part of a generator incorporating the magnetic flux conducting unit of FIG. 1, in accordance with an embodiment of the present invention;

FIG. 2A is a schematic side view of a power generation machine incorporating the generator shown in FIG. 2;

FIG. 3 is a schematic side view of part of a generator incorporating the magnetic flux conducting unit of FIG. 1, in accordance with an alternative embodiment of the present invention;

FIG. 4 is a schematic front view of part of a generator incorporating the magnetic flux conducting unit of FIG. 1, in accordance with a further alternative embodiment of the present invention;

DETAILED DESCRIPTION

Figure 5:
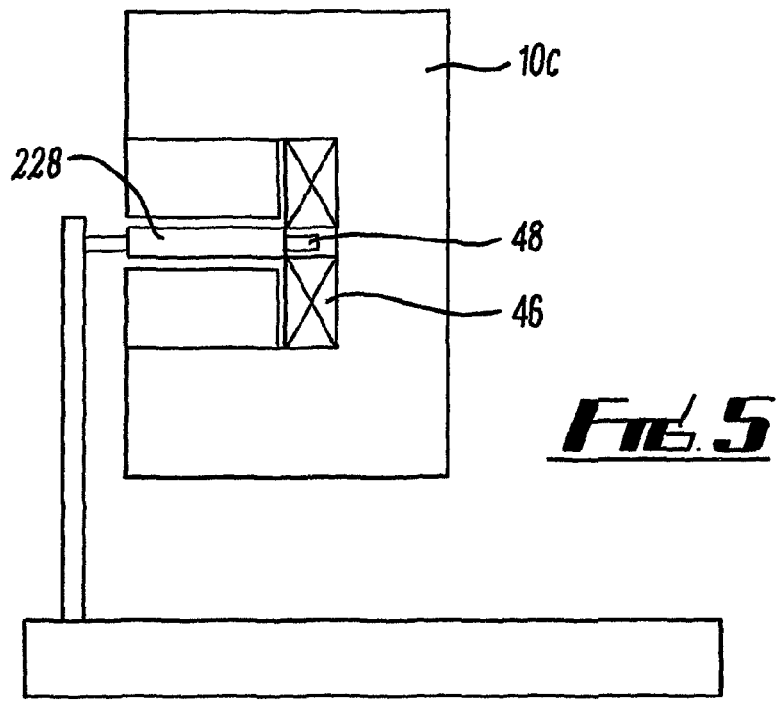
FIG. 5 is an end view of the generator of FIG. 4.

Turning firstly to FIG. 1, there is shown a schematic view of a magnetic flux conducting unit for a generator, in accordance with an embodiment of the present invention, the unit indicated generally by reference numeral 10. Part of a generator 12 incorporating the magnetic flux conducting unit 10 shown in FIG. 1 is illustrated in the schematic side view of FIG. 2. As shown in FIGS. 1 and 2, the magnetic flux conducting unit 10 comprises a pair of magnets 14, 16, a pair of opposed magnetic flux conducting elements in the form of arms 18 and 20 and a connecting portion 22 extending between the arms 18 and 20. The magnets 14 and 16 are arranged such that a magnetic flux flow path 24 (indicated in broken outline) extends in an anti-clockwise direction, when viewing FIG. 1. It will be understood that, in order to achieve to this, the poles of the magnets 14 and 16 may be oriented S-N/S-N when viewing FIG. 1 from top to bottom. The arms 18 and 20, together with the connecting portion 22, form a generally C-shaped core and are of a magnetic flux conducting material such as iron, or an iron alloy such as steel.

A space or air gap 26 is defined between the opposed arms 18, 20, and the magnets 14 and 16 are located within the air gap, the magnet 14 magnetically coupled to the arm 18 and the magnet 16 to the arm 20. If desired, the magnets 14, 16 may be magnetized in situ, and may be held in position by a clip, clamp or support prior to magnetization. The air-cored coil assembly 28 of the generator 12 is located in the air gap 26 between the opposed magnets 14, 16 and, as will be understood by persons skilled in the art, the air-cored coil assembly 28 comprises a number of air-cored coils of current conducting material such as copper.

The generator 12 shown in FIG. 2 is of a rotary type, and comprises a number of the units 10 arranged around a circumference of a rotor disc, wheel or the like 30 which is mounted on a rotor shaft 32. The rotor shaft 32 is coupled to a prime mover of a power generation machine. FIG. 2A illustrates a power generation machine in the form of a wind machine 33 having a prime mover in the form of a rotor 35, the rotor coupled in a direct drive to the generator 12 by a shaft 37. The generator 12 is thus a direct drive generator, being directly driven by the output shaft 37 of the rotor 35.

The generator 12 also includes a stator 34 having a stator disc, frame or the like 36 to which the coil assembly 28 is mounted. The stator 34 is mounted on the shaft 32 by a bearing 39. As shown in FIG. 2, the units 10 are arranged around a periphery of the rotor disc 30, respective planes of the unit arms 18 and 20 being disposed perpendicular to the rotor shaft axis 40.

In use of the generator 12, magnetic attraction forces exist between the pairs of opposed arms 18, 20 of each magnetic flux conducting unit 10. These magnetic attraction forces seek to close the air gap 26 and thereby impart mechanical loads on the arms 18, 20. By virtue of the connection with the portion 22, and the fact that the magnets 14, 16 are arranged such that the magnetic flux flow path 24 extends from the magnet 16, through the arm 20, through the connecting portion 22, through the arm 18 and to the magnet 14, these mechanical loads are transmitted to the connecting portion 22. In effect, the arms 18 and 20 are cantilevered relative to the connection portion 22. The attraction force between the arms 18, 20 imparts a mechanical load on the arm 18. This generates a turning moment about a central or neutral axis 42 of the C-core in an anti-clockwise direction when viewing FIG. 1. In contrast, mechanical loading on the arm 20 generates a turning moment about the neutral axis 42 in a clockwise direction. These turning moments effectively balance and cancel out with a result that the magnetic attraction forces between the arms 18 and 20 are reacted through and balanced within the connecting portion 22. By this arrangement, it is not necessary to provide a large, heavy support structure in order to maintain the air gap between the arms 18 and 20 and thus the overall size and weight of the generator 12, when compared to existing, direct drive generators, is greatly reduced. This is achieved whilst maintaining a high flux density and a small air gap between the arms 18 and 20, thus ensuring efficient operation of the generator 12.

The generator 12 operates to generate electricity as follows. As noted above, the various units 10 are arranged around the periphery 38 of the rotor disc 30. The magnetic flux flow path in the units adjacent to the unit 10 are in opposite directions. Thus the flux flow path in the units adjacent to the unit 10 shown in FIG. 2 flow in clockwise directions. This is achieved by reversing polarity of the magnets 14, 16 on the units adjacent to the unit 10 shown in the figure.

Accordingly, in use and when the rotor disc 30 is driven by the wind machine rotor shaft 37, the coil assembly 28 is exposed to successively changing magnetic flux flow, this generating a current in the coils of the coil assembly. It will be understood that the units 10 may be provided on the stator 34 and the coil assembly 28 on the rotor 29, if desired.

Turning now to FIG. 3, there is shown a schematic side view of part of a generator incorporating the unit 10 shown in FIG. 1, in accordance with an alternative embodiment of the present invention, the generator indicated generally by reference numeral 112. Like components of the generator 112 with the generator 12 of FIG. 2 share the same reference numerals, incremented by 100.

The generator 112 includes two rotor discs 130a and 130b, each carrying an array of flux conducting units 10 spaced around a circumference of each of the discs 130a, 130b adjacent to the respective edges 138a, 138b. The respective arms 18, 20 of the units 10 on each rotor 130a, 130b are arranged such that the planes of the arms are parallel to the rotor shaft axis 140. A stator 134 of the generator 112 carries two sets of coil assemblies 128a, 128b for each of the units 10 on the rotors 130a, 130b. The generator 112 thus permits two rotors 130a, 130b to be driven from a common rotor shaft 132, providing improved efficiency without a significant increase in dimensions.

Turning now to FIGS. 4 and 5, there are shown schematic side and end views of part of a generator incorporating the magnetic flux conducting unit 10 of FIG. 1, in accordance with a further alternative embodiment of the present invention, the generator indicated generally by reference numeral 212. Like components of the generator 212 with the generator 12 of FIG. 2 share the same reference numerals, incremented by 200.

The generator 212 is of a linear type, suitable for use with a linear power generation machine such as a wave power generation machine or a free-piston Stirling engine in a domestic CHP unit (not shown). In the illustrated embodiment, a number of flux conducting units 10c, 10d, 10e and 10f are shown and are mounted on a translator 44 which is directly coupled to the prime mover of the machine. A coil assembly 228 is arranged in the air gaps 26c to 26f of the respective units 10. As shown in the figure, the direction of flux flow in the adjacent units 10c to 10f are in opposite directions, the arrow tail indicating flow into the paper and the arrow head indicating flow out of the paper in the respective flow paths 24c to 24f. Accordingly, on translation of the units 10c to 10f back and forth in the direction of the arrows X-X', the coil assembly 228 experiences successively changing magnetic flux flow, generating a current in the coils. As shown in FIG. 5, a bearing assembly 46 is provided between a support 48 on which the coil assembly 228 is mounted, to facilitate relative movement between the units 10 and the coil assembly 228.

Figure 6:
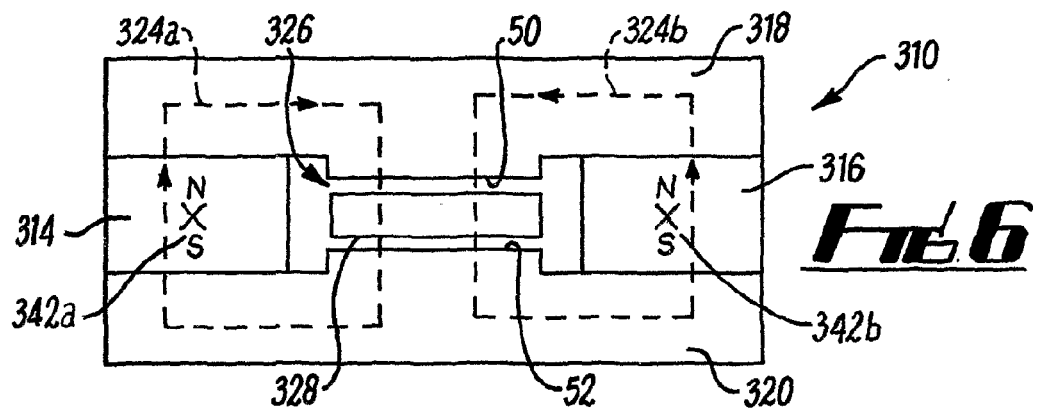
FIG. 6 is a schematic view of a magnetic flux conducting unit for a generator, in accordance with a further alternative embodiment of the present invention.

Turning now to FIG. 6, there is shown a schematic view of a magnetic flux conducting unit for a generator, in accordance with an alternative embodiment of the present invention, the unit indicated generally by reference numeral 310. Like components of the unit 310 with the unit 10 of FIG. 1 share the same reference numerals, incremented by 300.

As shown in the figure, the unit 310 includes a pair of opposed magnetic flux conducting elements in the form of arms 318, 320 which are coupled together by two magnets 314, 316, each of which defines a connecting portion of the unit 310. A space or air gap 326 is defined between surfaces 50 and 52 of the respective arms 318, 320 in which a coil assembly 328 of a generator is received.

Figure 7:
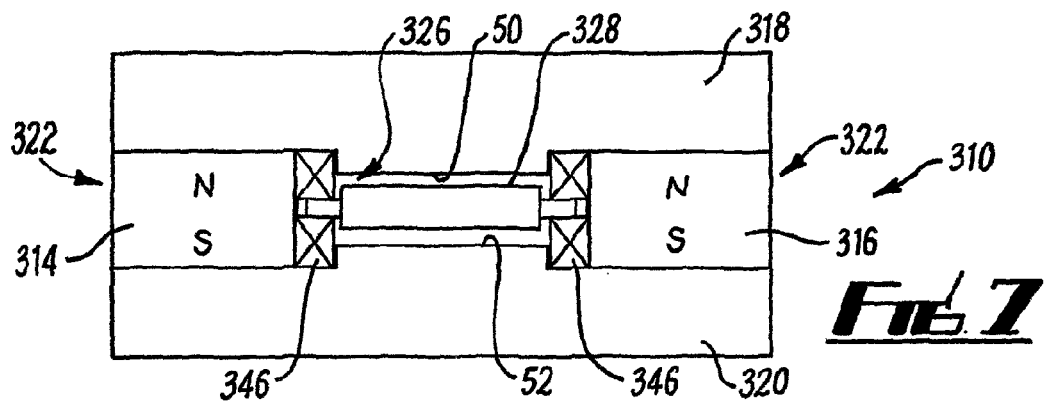
FIG. 7 is a view of the unit shown in FIG. 6, illustrating a bearing assembly by which a coil assembly is mounted to the unit.

The unit 310 is generally rectangular in cross-section and the coil assembly 328 is provided centrally within the structure. As shown in FIG. 7, bearing assemblies 346 mount the coil assembly 328 within the air gap 326, and facilitate relative movement between the unit 310 and the coil assembly 328.

The magnets 314, 316 are arranged relative to the arms 318, 320 such that two magnetic flux flow paths 324a and 324b are generated, in two loops extending from the magnets 314/316, into the arm 318, through the air gap 326, into the arm 320 and back to the respective magnet 314/316. These magnetic flux flow paths 324a, 324b extend in clockwise and anti-clockwise directions, respectively, when viewing FIG. 6.

By this arrangement of the magnets 314, 316, magnetic attraction forces between the arms 318, 320 are balanced on both sides of the unit 310 within the magnets 314 and 316, about respective neutral axes 342a and 342b. Accordingly, in a similar fashion to the unit 10 of FIG. 1, magnetic attraction forces between the arms 318 and 320 are reacted through and balanced within the connecting portions (magnets 314 and 316). This avoids a requirement to provide a large and heavy support structure. Additionally, provision of the two magnets 314, 316 provides a higher magnetic flux density in the air gap 326 in comparison to that present in the air gap 26 of the unit 10 shown in FIG. 1, providing improved efficiency of a generator incorporating the unit 310.

Figure 8:
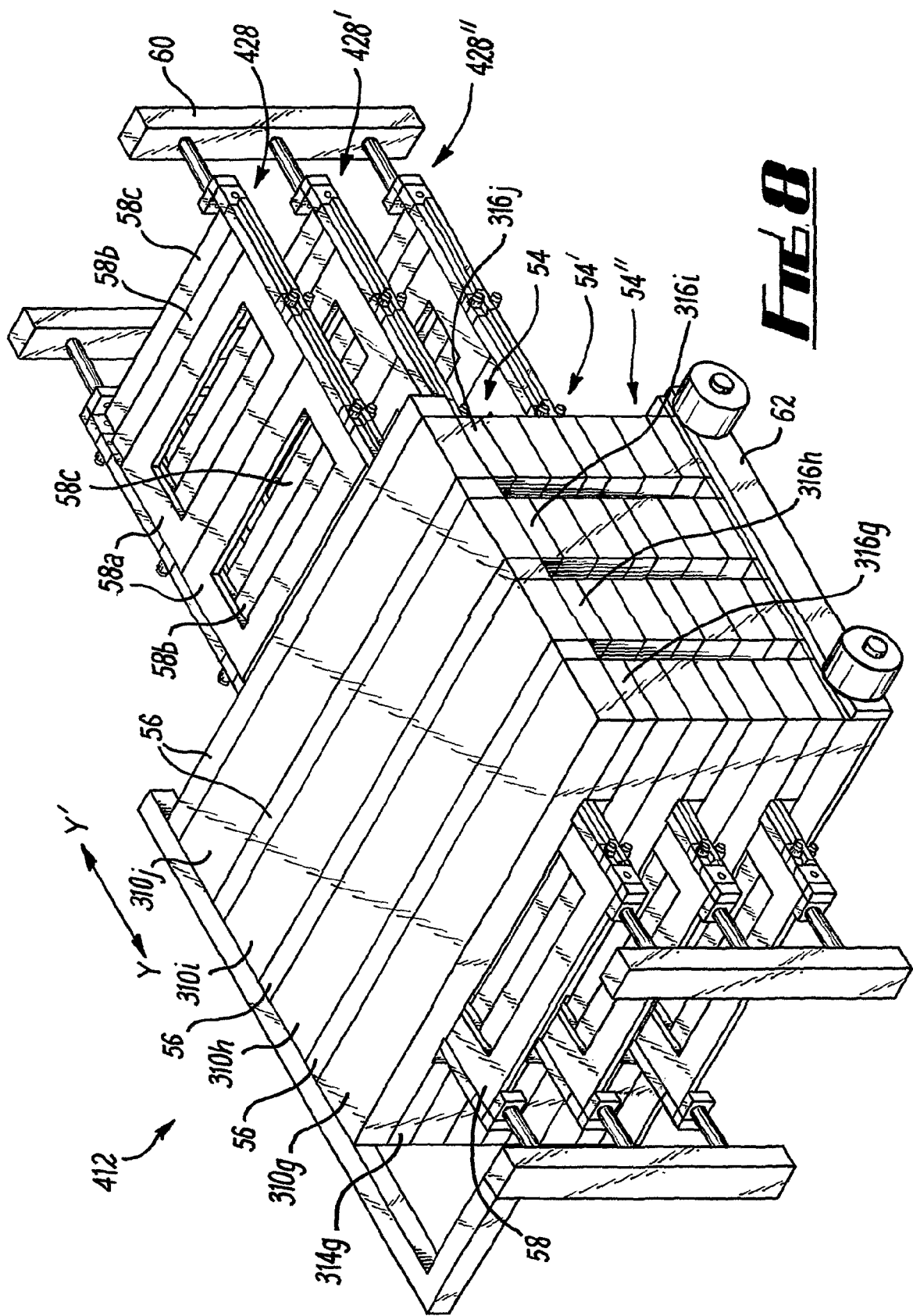
FIG. 8 is a perspective view of a generator incorporating magnetic flux conducting units similar to the unit shown in FIGS. 6 and 7, in accordance with a preferred embodiment of the present invention.
Figure 9:
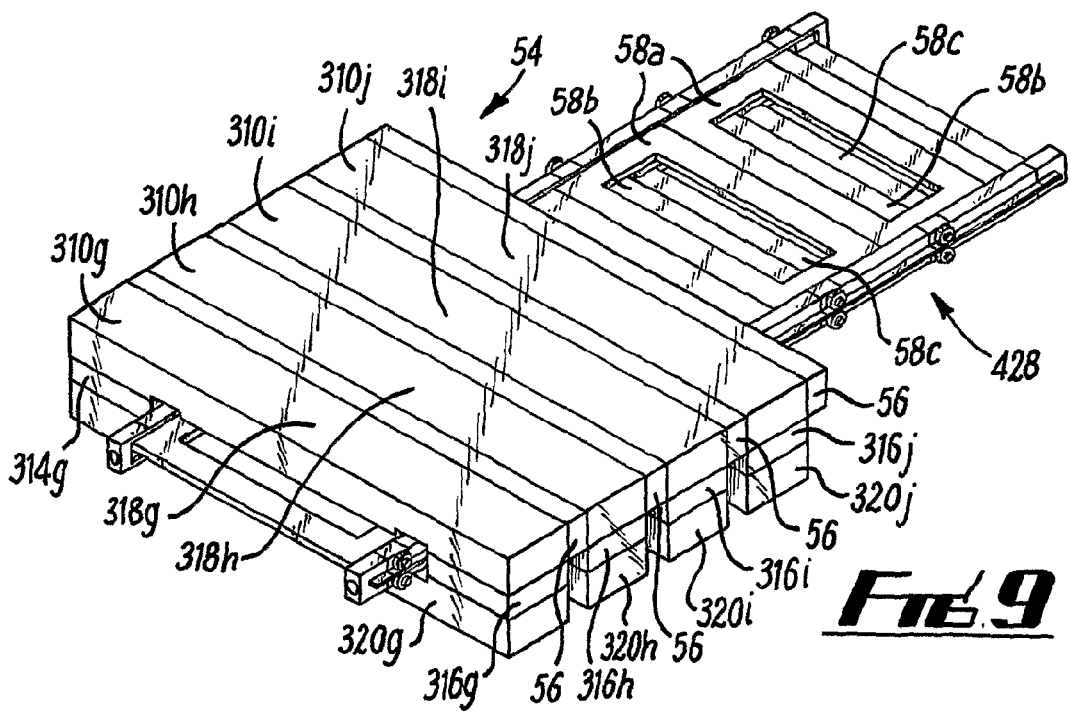
FIG. 9 is a view of part of the generator shown in FIG. 8.

A generator incorporating magnetic flux conducting of like design to the units 310 is shown in the perspective view of FIG. 8, and is indicated generally by reference numeral 412. Like components of the generator 412 with the generator 12 shown in FIG. 2 share the same reference numerals, incremented by 400. The generator 412 comprises three arrays of flux conducting units and corresponding coil assemblies 54, 54' and 54". One of the arrays, 54', is shown in FIG. 9 separately from a remainder of the generator 412, for ease of reference. It will be understood that the generator 412 is of a linear type, similar to that described above with reference to FIG. 4.

The array 54 comprises a number of flux conducting units 310g to 310j and, as with the generator 212 of FIG. 4, the magnetic flux flow paths in adjacent units flow in opposite directions. The units 310g to 310j are each separated by non-magnetically conductive spacers 56, and are coupled to the translator of a reciprocating prime mover or reciprocating mechanical load (not shown), such as may be found in a wave power machine. The coil assembly 428 includes a number of coil sections 58, and the units 310g to 310j and coil assembly 428 are shown separately in FIGS. 10 and 11, respectively.

Figure 10:
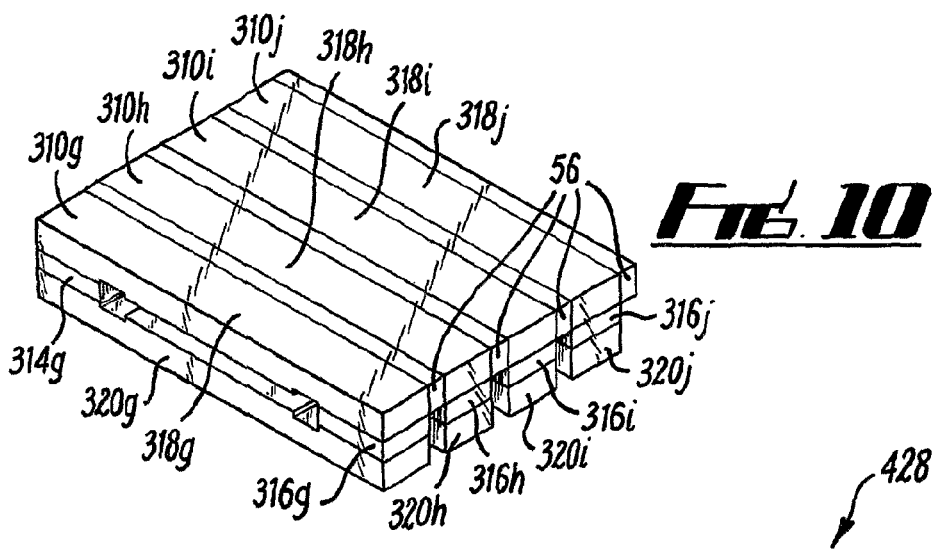
FIGS. 10 and 11 are views of the magnetic flux conducting units and of a coil assembly, respectively, forming parts of the generator shown in FIG. 9.
Figure 11:
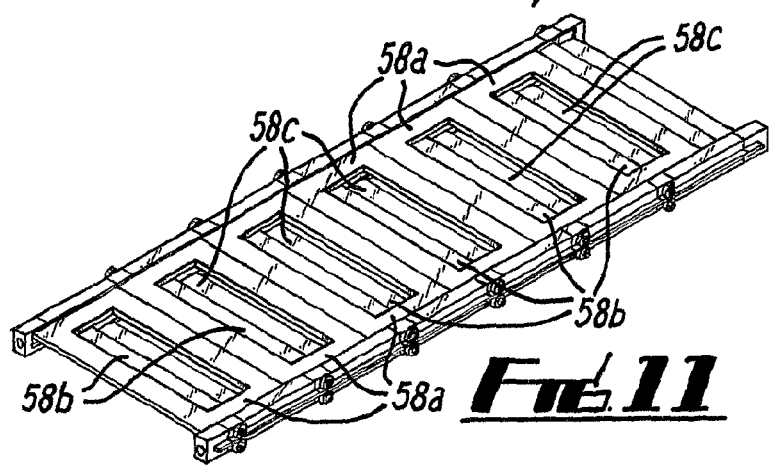

Each of the coil assemblies 428, 428' and 428" (FIG. 8) are mounted to a stationary frame 60, and each coil assembly 428, 428' and 428" is a three-phase winding comprising three layers of coil sections or windings 58. The uppermost coil assembly 428 is shown in FIGS. 9 to 11, and comprises three layers of windings 58a, 58b and 58c, each layer representing one phase. It will be understood that the arrays 428' and 428" are of similar structure. The units 310 of each array 54, 54' and 54" are mounted one on top of another on a moveable base 62. In use, the units 310 of the arrays 54, 54' and 54" are reciprocated back and forth in the direction of the arrows Y-Y', as shown in FIG. 8. This reciprocating movement and the variation in flux flow in adjacent units 310 of each array 54 ensures that each coil section 58 of the respective coil assembly 428 experiences progressively changing magnetic flux flow directions, generating current.

By providing a generator 412 with arrays 54, 54' and 54" in this fashion, a common drive source may be utilized whilst optimizing size and weight of the generator 412 and providing improved efficiencies.

Figure 12:
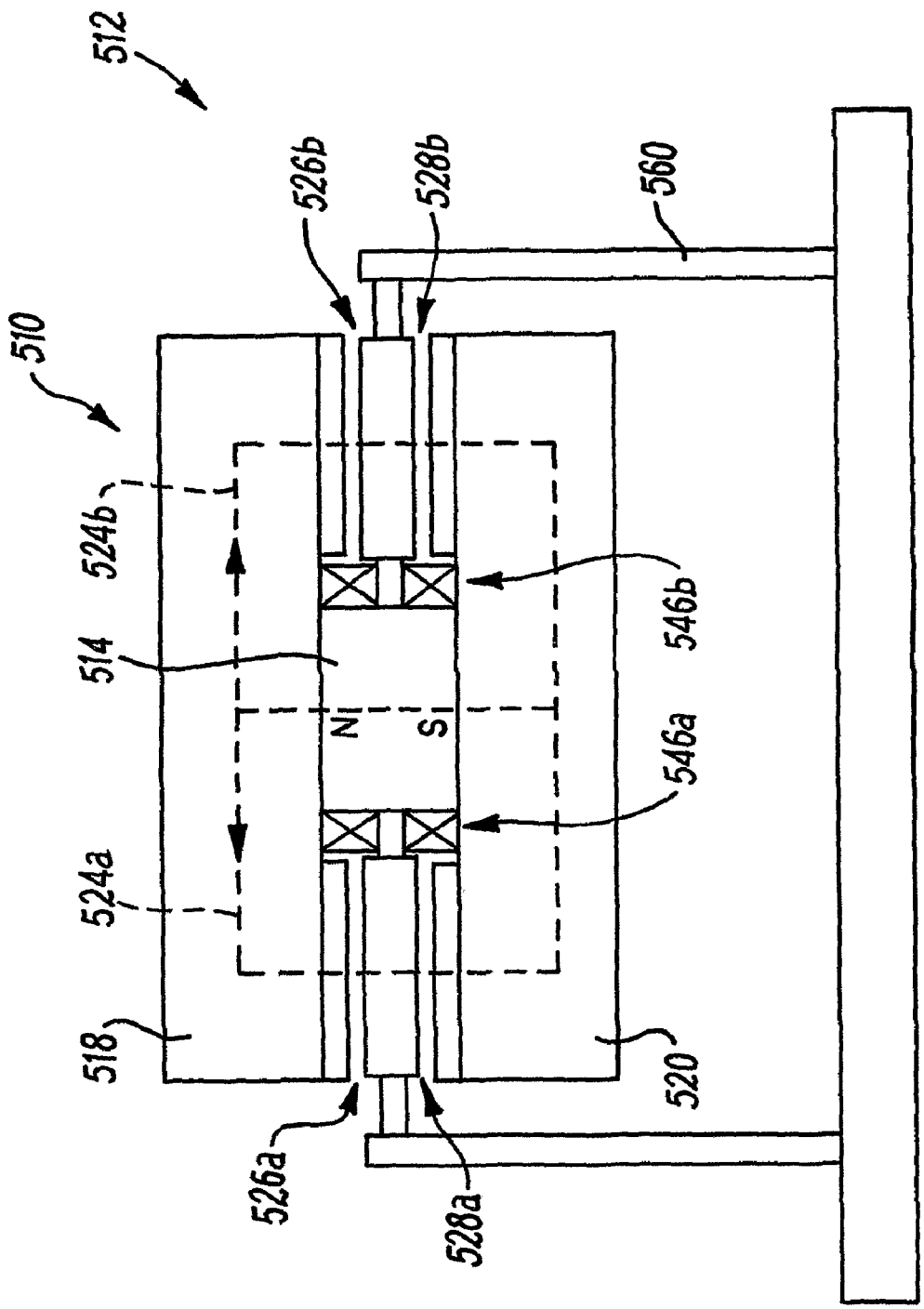
FIG. 12 is a schematic end view of a generator in accordance with a still further alternative embodiment of the present invention.

Turning now to FIG. 12, there is shown a schematic end view of part of a generator in accordance with a further alternative embodiment of the present invention, the generator indicated by reference numeral 512.

The generator 512 is a linear generator similar to the generator 212 of FIG. 4 and the generator 412 of FIG. 8. However, the generator 512 includes a number of magnetic flux conducting units 510, like components of the unit 510 with the unit 10 of FIG. 1, and of the generator 512 with the generator 12 of FIG. 2, sharing the same reference numerals incremented by 500.

The unit 510 essentially comprises two of the units 10 of FIG. 1 provided back-to-back, and with a single magnet 514 extending between flux conducting arms 518, 520 of the unit 510. Two magnetic flux flow paths 524a and 524b are generated within the unit 510, extending from the magnet 514 into the arm 518, across air gaps 526a/526b, into the arm 524 and back to the magnet 514. The magnet of an adjacent unit is of opposite polarity, such that the flow paths in the adjacent unit extend in opposite directions.

The units 510 are each coupled to a translator of a power generation machine such as a wave power machine (not shown), and are reciprocated in the same fashion as the generators 212, 412. Coil assemblies 528a, 528b are provided in the air gaps 526a, 526b and are mounted on the stationary frame 560 by bearing assemblies 546a, 546b. The generator 512 operates in a similar fashion to the generator 412 to generate electricity.

Figure 13:
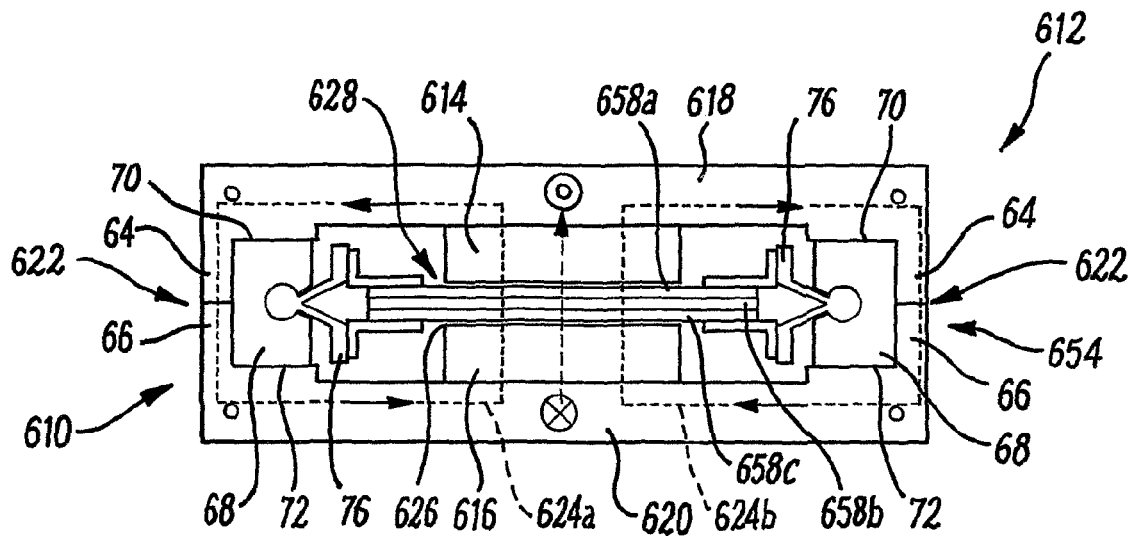
FIG. 13 is an end view of part of a generator, incorporating a magnetic flux conducting unit, in accordance with a still further alternative embodiment of the present invention.

Turning now to FIG. 13, there is shown an end view of part of a generator, incorporating a magnetic flux conducting unit, in accordance with a still further alternative embodiment of the present invention, the generator indicated generally by reference numeral 612 and the flux conducting unit by reference numeral 610. Like components of the generator 612 with the generator 12 of FIG. 2, and of the unit 610 with the unit 10 of FIG. 1, share the same reference numerals, incremented by 600. However, only the substantive differences will be described herein in detail.

Figure 14:
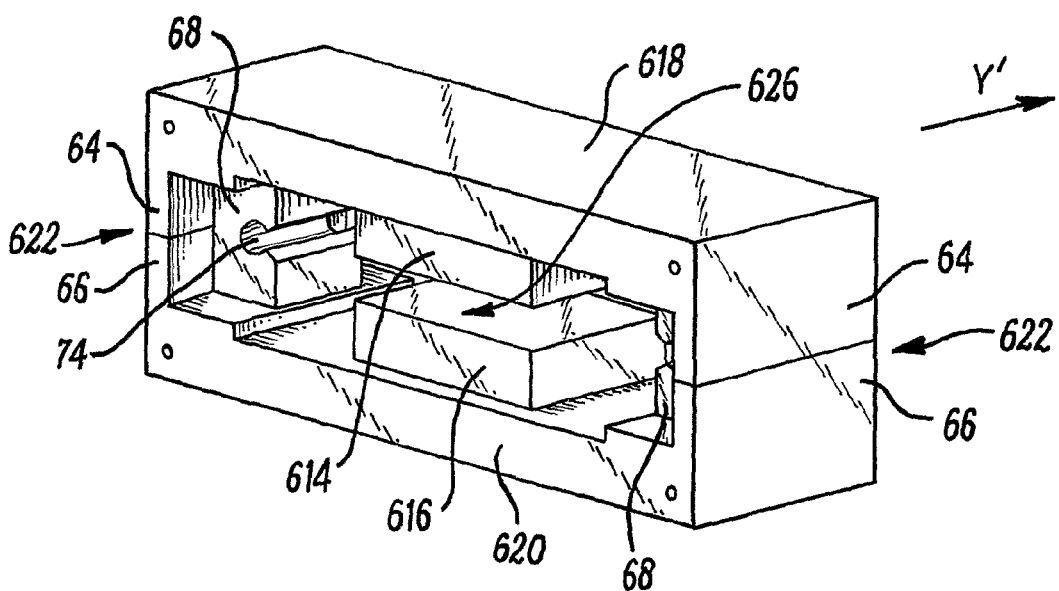
FIG. 14 is a perspective view of the magnetic flux conducting unit shown in FIG. 13.

The generator 612 is in fact of similar construction to the generator 412 of FIG. 8, and is thus a linear generator comprising a number of arrays of flux conducting units and coil assemblies, one of which is shown and given the reference numeral 654. The array 654 includes a number of flux conducting units 610 arranged in abutment, one of which is shown in the Figure. The units 610 each comprise a pair of spaced opposed arms 618, 620 carrying respective magnets 614 and 616. The arms 618 and 620 are generally C-shaped in cross section and include lips or end sections 64 and 66, respectively, which together define connecting portions 622. The array 654 includes a coil assembly 628 which is located in an air gap 626 defined between the magnets 614 and 616, and which includes a number of separate windings or coil sections 658a, 658b and 658c. Bearings 68 are mounted between shoulders 70 and 72 of the arms 618 and 620, and could be a low friction material such as PTFE, hydrostatic bearing, magnetic bearing or more conventional roller bearing. In this example a slider bearing is shown. As best shown in FIG. 14, which is a perspective view of the unit 610, the bearings 68 include channels 74. The coil assembly 628 includes mountings 76 which are shaped to engage within the bearing channels 74, and which permit sliding movement of the units 610 relative to the coil assembly 628. Accordingly, in a similar fashion to the generator 412 shown in FIG. 8, the units 610 of the array 654 are reciprocated back and forth relative to the coil assembly 628, generating an alternating current.

In use, two flux flow paths 624a and 624b are generated in the unit 610, and the attraction forces between the arms 618 and 620 are balanced within the connecting portions 622 by abutment between the lips 64 and 66. It will be understood, however, that the bearings 68 also resist the attraction forces between the arms 618 and 620 and thus may be considered to form part of the connecting portions 622. Additionally, it will be appreciated that attraction forces between the lips 64 and 66 hold the arms 618 and 620 together.

The units 610 are arranged in the generator 612 in a similar fashion to the units 310 shown in FIG. 8, save that spacers are omitted so that each unit 610 is located in abutment with the adjacent unit or units. This is because the inventors have discovered that flow of flux in an axial direction along the arrays of units 610 is beneficial and improves efficiency of the generator 612 in use. For the arrangement of the unit 610 shown in FIG. 13, with flux flow directions shown by the arrows in the flow paths 624a and 624b, flux flow also occurs from the arm 620 of one unit 610 in the direction Y' in FIG. 14 (as indicated by the arrow tail going into the paper in FIG. 13); into an arm 620 on an adjacent unit 610 (not shown); up through magnets 616 and 614 of the adjacent unit; into the arm 618 of the adjacent unit; and back into the arm 618 of the unit 610 shown in FIG. 13 (as indicated by the arrow head coming out of the paper).

Figure 15:
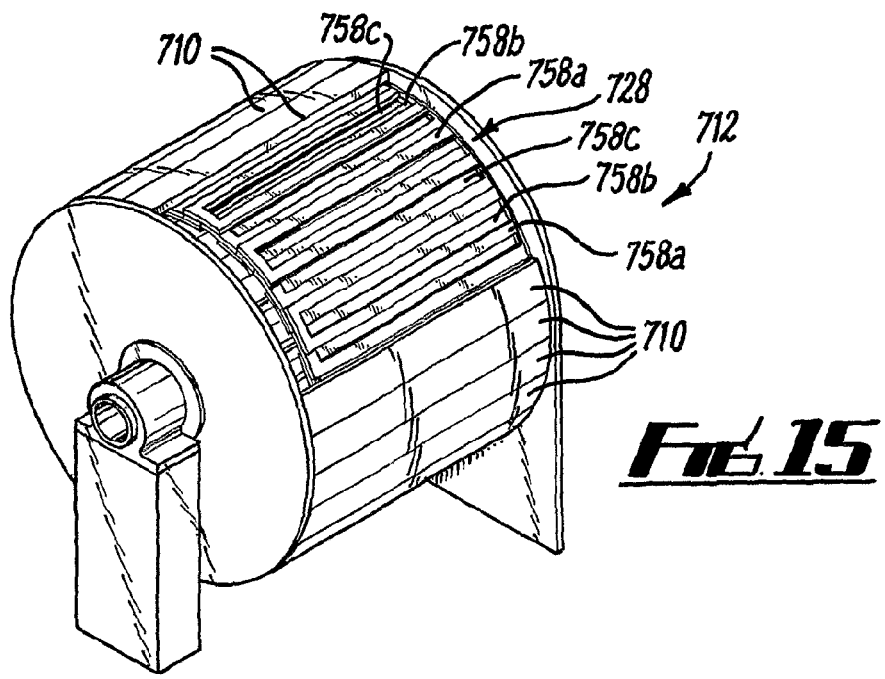
FIG. 15 is a perspective, partially cut-away view of a generator, incorporating a magnetic flux conducting unit, in accordance with a still further alternative embodiment of the present invention.

Turning now to FIG. 15, there is shown a perspective, partially cut-away view of a generator, incorporating a magnetic flux conducting unit, in accordance with a still further alternative embodiment of the present invention. The generator is indicated generally by reference numeral 712 and is a rotary generator incorporating a number of circumferentially arranged units 710. Like components of the unit 710 with the unit 10 of FIG. 1, and of the generator 712 with the generator 12 of FIG. 2, share the same reference numerals incremented by 700. The generator 712 is generally of similar construction to the generator 112 shown in FIG. 3, save that it includes only a single circumferential array of flux conducting units 710 and coil assemblies 728.

Figure 16:
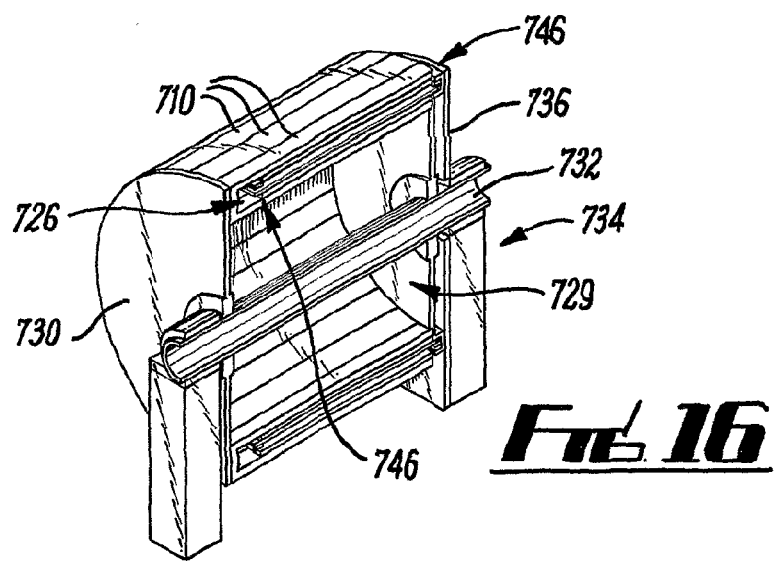
FIG. 16 is a longitudinal sectional view of the generator shown in FIG. 15.
Figure 17:
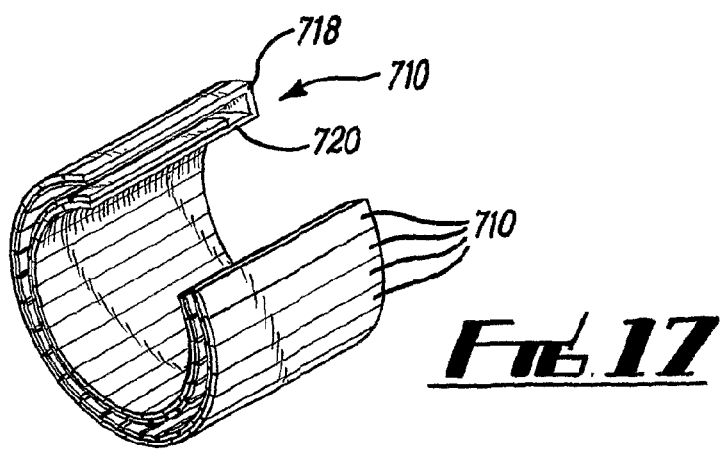
FIG. 17 is a view of the flux conducting unit of FIG. 15, cut-away as shown in FIG. 15.

The generator 712 is shown in more detail in the longitudinal sectional view of FIG. 16, which is drawn to a smaller scale, and in FIG. 17, which is a view of the flux conducting units 710, cut-away as shown in FIG. 15 and also drawn to a smaller scale.

The generator 712 includes a rotor 729 having a rotor shaft 732 carrying a rotor disc 730. The circumferentially arranged flux conducting units 710 are each mounted to the rotor disc 730 around a circumferential edge of the disc, and are of similar structure to the units 10 shown in FIG. 3, save that arms 718 and 720 are of greater length. As with the units 620 of the generator 612 of FIG. 13, the units 710 are butted-up to one another and thus provided without spacers, improving efficiency. A coil assembly 728, which comprises a number of coil sections 758, is mounted on a stator plate 736, such that coil sections 658 extend into the respective air gaps 726 of the units 710. The coil sections 658 are mounted in the air gaps 726 using suitable bearings 746. The generator 712 is provided as part of a wind machine 733, which is shown in FIG. 18.

In use, the stator 734 carrying the coil assembly 728 is mounted in a nascelle 78 of the wind machine 733, whilst the rotor shaft 732 is coupled to a prime mover in the form of a turbine blade assembly 80. In this fashion, rotation of the blade assembly 80 transmits a drive force to the rotor shaft 732 and thus to the rotor disc 730.

This rotates the flux conducting units 710, generating an alternating current in the fashion described above.

Figures 18, 19:
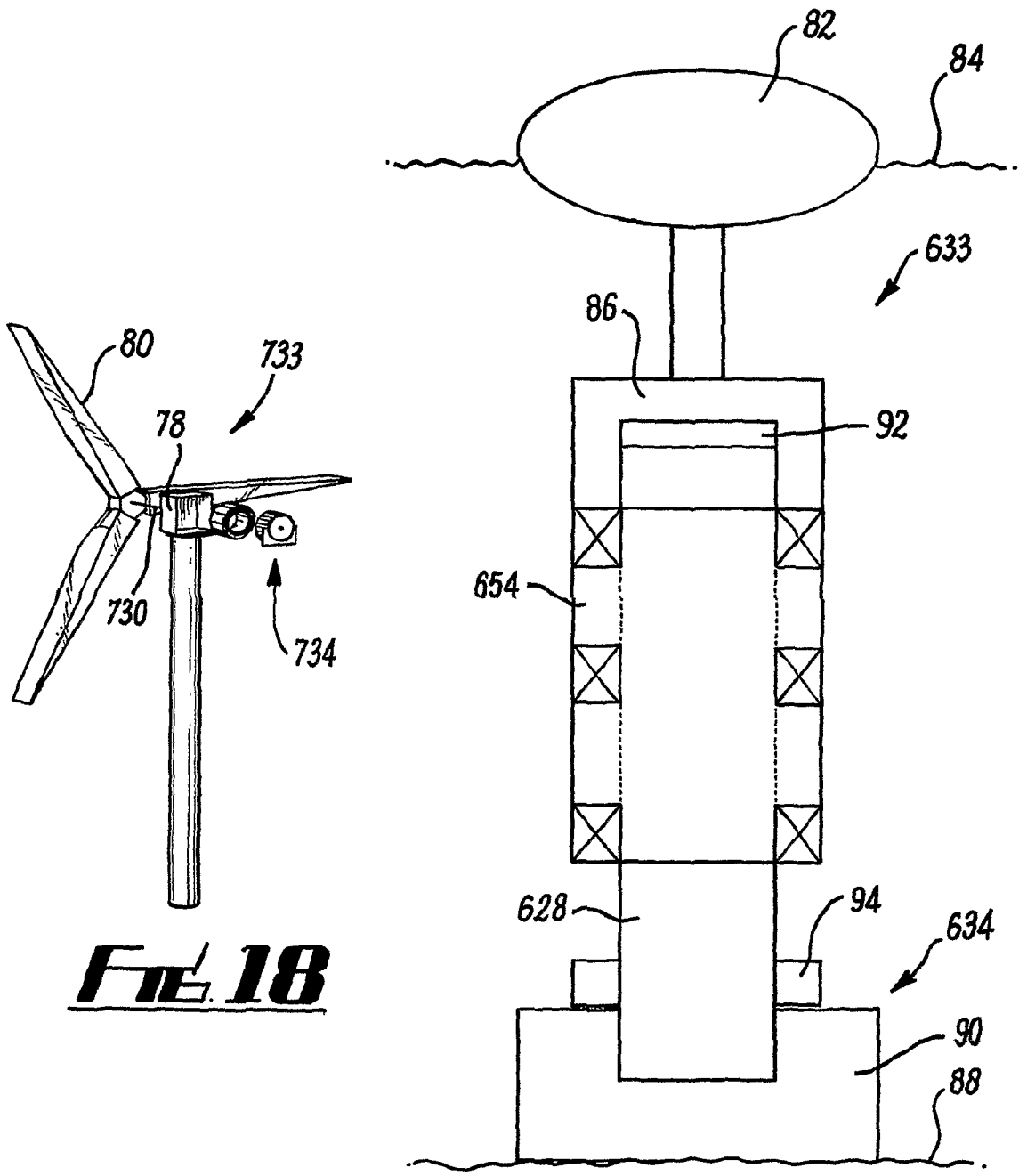
FIG. 18 is a view of a power generation machine incorporating the generator of FIG. 15.
FIG. 19 is a schematic illustration of a power generation machine incorporating the generator of FIG. 13.

Turning finally to FIG. 19, there is shown a schematic illustration of a power generation machine in the form of a wave device 633 incorporating the generator 612 shown in FIG. 13. The generator 612 is illustrated schematically in the Figure. The wave device 633 includes a buoy 82, which is shown floating on a sea surface 84, however, the inherent buoyancy of the buoy 82 relative to the weight of the remaining components of the device 633 may be such that the buoy is submerged below the surface 84.

The buoy 82 is coupled to a series of arrays of flux conducting units by a coupling assembly 86, however, only a single such unit 654 is shown in the Figure. A stator 634 of the wave device 633 is provided on a seabed 88, and the coil assembly is mounted on a base 90 of the stator 634.

In use, the buoy 82 moves up and down under applied wave loading, moving the array 654 up and down and thus translating the flux conducting units 610 relative to the coil assembly 628, thereby generating an alternating current. End stops 92 and 94 define the maximum permissible extent of movement of the array 654 relative to the coil assembly 628.

Various modifications may be made to the foregoing without departing from the spirit and scope of the present invention.

For example, it will be understood that the generator may be used with or provided in a wide range of different types of machines, provided as a rotary or liner generator as required or desired, and may be used with or provided in, inter alia, wave, wind, tidal and marine current power generation machines.

The invention claimed is:

1. A rotary generator comprising at least one-air-cored coil assembly comprising a plurality of current conducting coils, and a plurality of magnetic flux conducting units, each of the plurality of magnetic flux conducting units comprising:
   at least one magnet;
   a pair of opposed magnetic flux conducting elements of iron or ferrous alloy defining a space therebetween for receiving the at least one air-cored coil assembly; and
   at least one connecting portion extending between the opposed magnetic flux conducting elements;
   wherein the at least one magnet is arranged relative to the opposed magnetic flux conducting elements such that magnetic attraction forces between the elements are reacted through and balanced within the connecting portion,
   the rotary generator comprising a rotor and a stator, one of the rotor and the stator carrying the plurality of flux conducting units and the other of the rotor and the stator carrying the at least one air-cored coil assembly, the rotor configured to be coupled to a drive member of a prime mover of a power generation machine and thereby configured for rotation relative to the stator,
   and wherein the plurality of flux conducting units are arranged circumferentially around the circumference of a disc of the rotor or the stator.

2. The generator of claim 1 wherein the generator is one of:
   a direct drive generator configured to be coupled directly to a prime mover of a power generation machine; and
   an indirect drive generator, configured to be coupled to a prime mover of a power generation machine through a gearbox.

3. The generator of claim 1 wherein the at least one magnet of the flux conducting unit is arranged relative to the opposed magnetic flux conducting elements such that a magnetic flux flow path within the magnetic flux conducting unit extends through the connecting portion.

4. The generator of claim 1 wherein the magnetic flux conducting unit is substantially C-shaped in cross-section, the connecting portion forming a central member of the unit and the flux conducting elements coupled in a cantilever arrangement relative to the central member.

5. The generator of claim 1 wherein the magnetic flux conducting unit is substantially I-shaped in cross-section, the connecting portion forming a central member of the unit and the flux conducting elements coupled to the central member so as to form two cantilevered sections either side of the central member, with two spaces between the flux conducting elements on either side of the connecting portion, the magnetic flux conducting unit further comprising two air-cored coil assemblies, one received in each space.

6. The generator of claim 1 wherein the magnetic flux conducting unit is generally rectangular in cross-section, with two connection portions extending between the opposed magnetic flux conducting elements and wherein the space is defined between the flux conducting elements and the two connecting portions.

7. The generator of claim 1 wherein the at least one magnet is arranged within the space defined between the flux conducting elements.

8. The generator of claim 1 wherein the at least one magnet of the flux conducting unit defines the connecting portion of the unit.

9. The generator of claim 1, comprising two magnets extending between the flux conducting elements, each magnet defining a connecting portion, and spaces defined between the magnets for receiving an air-cored coil assembly.

10. The generator of claim 1 wherein the magnetic flux conducting unit comprises a one-piece body defining the flux conducting elements and the connecting portions, and with an aperture therethrough defining the space between the flux conducting elements.

11. The generator of claim 10 wherein the magnetic flux conducting unit comprises two magnets positioned on opposite faces of the flux conducting elements and a winding forming the air-cored coil assembly located between the two magnets in the space therebetween.

12. The generator of claim 1, comprising a plurality of magnetic flux conducting units, and wherein a direction of flow of magnetic flux through the space associated with one unit is opposite a direction of flow of magnetic flux of an adjacent unit.

13. A rotary motor comprising at least one-air-cored coil assembly comprising a plurality of current conducting coils, and a plurality of magnetic flux conducting units, each of the plurality of magnetic flux conducting units comprising:
   at least one magnet;
   a pair of opposed magnetic flux conducting elements of iron or ferrous alloy defining a space therebetween for receiving at least one air-cored coil assembly; and
   at least one connecting portion extending between the opposed magnetic flux conducting elements;
   wherein the at least one magnet is arranged relative to the opposed magnetic flux conducting elements such that magnetic attraction forces between the elements are reacted through and balanced within the connecting portion,
   the rotary motor comprising a rotor and a stator, one of the rotor and the stator carrying the plurality of flux conducting units and the other of the rotor and the stator carrying the at least one air-cored coil assembly, the rotor configured for rotation relative to the stator,
   and wherein the plurality of flux conducting units are arranged circumferentially around the circumference of a disc of the rotor or the stator.

14. The generator of claim 1, comprising a magnet coupled to each flux conducting element, the magnets arranged with opposite poles facing one another and with the at least one air-cored coil assembly disposed between opposing surfaces of the magnets.

15. The generator of claim 1 wherein the main axes of the plurality of flux conducting elements of the units are one of substantially parallel and substantially perpendicular to an axis of a shaft of the rotor.

16. The generator of claim 1, comprising a plurality of flux conducting units, adjacent units being one of:
   separated by an air gap;
   separated by a non-magnetically conductive spacer; and
   butting up against one another.

* * * * *